United States Patent [19]
Haglund

[11] Patent Number: 5,179,256
[45] Date of Patent: Jan. 12, 1993

[54] COLLISION SENSOR
[75] Inventor: Artur L. Haglund, Vargarda, Sweden
[73] Assignee: General Engineering (Netherlands) B.V., Utrecht, Netherlands
[21] Appl. No.: 698,003
[22] Filed: May 10, 1991
[30] Foreign Application Priority Data May 11, 1990 [GB] United Kingdom ............... 9010598

[51] Int. Cl.⁵ ...................... H01H 35/00; B60K 28/00
[52] U.S. Cl. .................... 200/52 R; 180/282; 200/61.44; 200/61.45 R; 280/735
[58] Field of Search ............ 200/61.42–61.53, 200/52 R, 61.93, 85 A; 280/730–735; 180/271, 274, 282

[56] References Cited

U.S. PATENT DOCUMENTS

| 3,670,119 | 6/1972 | Gebhardt et al. ............... 200/52 R |
| 3,946,178 | 3/1976 | Eberle et al. .................. 200/85 A |
| 4,527,150 | 7/1985 | Porat .......................... 340/541 |
| 4,966,388 | 10/1990 | Warner et al. .................. 280/730 |
| 4,977,388 | 12/1990 | Park .......................... 200/61.44 |
| 5,051,567 | 9/1991 | Tedesco ....................... 235/462 |

FOREIGN PATENT DOCUMENTS

| 886124 | 3/1981 | Belgium . |
| 0199024 | 10/1986 | European Pat. Off. . |
| 2016777 | 9/1979 | United Kingdom . |
| 2041609 | 9/1980 | United Kingdom . |
| 2150758 | 7/1985 | United Kingdom . |

Primary Examiner—J. R. Scott
Attorney, Agent, or Firm—Spencer, Frank & Schneider

[57] ABSTRACT

A sensor adapted to sense a side impact in a vehicle comprises an elongate element extending between two substantially fixed points spaced apart along the side of a vehicle, a sensor being provided adapted to sense tension in or longitudinal movement of the elongate element caused by an impact which deforms the vehicle.

16 Claims, 2 Drawing Sheets

COLLISION SENSOR

BACKGROUND OF THE INVENTION

The present invention relates to a collision sensor and more particularly relates to a collision sensor for use in a motor vehicle.

It is desired to provide a collision sensor in a motor vehicle adapted to activate safety equipment within the vehicle such as, for example, an air-bag. It is desired to inflate an air-bag when a collision occurs in order to protect the occupants of the vehicle.

OBJECT OF THE INVENTION

The present invention seeks to provide a collision sensor and more particularly, although not exclusively, seeks to provide a collision sensor responsive to side impact, such as impact on the side door of the vehicle.

SUMMARY OF THE INVENTION

According to this invention there is provided a sensor adapted to sense a side impact in a motor vehicle or the like, the sensor comprising at least one elongate element extending axially of the vehicle between two substantially fixed points adjacent the side of the vehicle, a sensor being provided adapted to sense tension in or longitudinal movement of the or each elongate element caused by an impact which deforms the vehicle.

The elongate element may be a wire, such as a wire contained within a flexible inextensible sleeve or casing. The sensor may comprise a housing including a member which is movable against a spring bias, the member being movable in response to tension in the elongate element.

BRIEF SUMMARY OF THE DRAWINGS

In order that the invention may be more readily understood, and so that further features thereof may be appreciated, the invention will now be described, by way of example, with reference to the accompanying drawings in which.

DESCRIPTION OF PREFERRED EMBODIMENT

Figure 1:
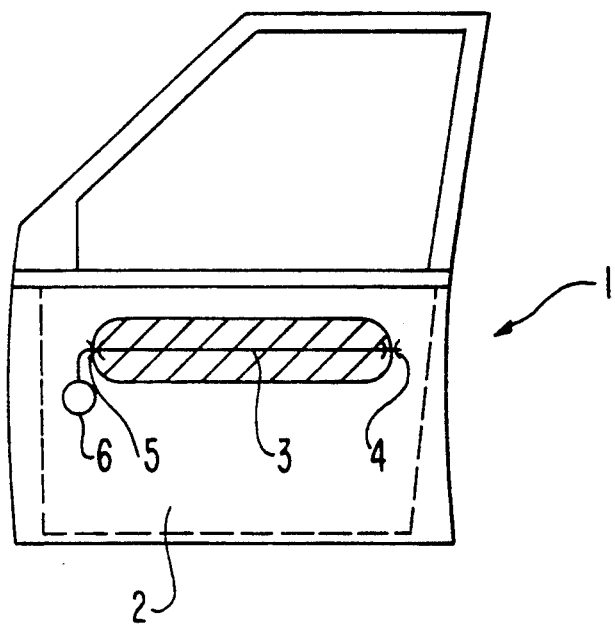
FIG. 1 is a diagrammatic side view of a motor vehicle door provided with a collision sensor in accordance with the invention.

Referring to FIG. 1 a motor vehicle door 1 is illustrated, which is of conventional form. Mounted within the hollow lower part 2 of the door is a safety device in accordance with the invention. The safety device includes an elongate element 3 which extends between two fixed points 4 and 5. Adjacent the point 5 a sensor 6 is provided. The arrangement is such that if the elongate portion is deformed in any way during an accident the sensor generates an electric signal. The sensor responds to tension generated in the elongate element, or longitudinal movement of the elongate member.

Figure 2:
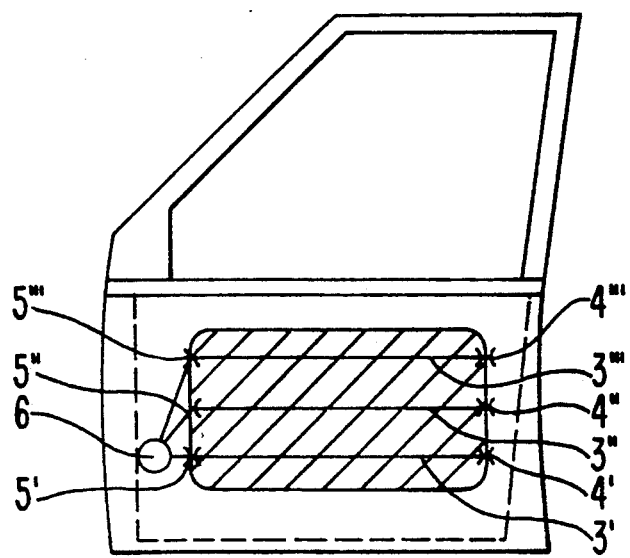
FIG. 2 is a side view of a modified embodiment of the invention, which is broadly similar to that of FIG. 1.

FIG. 2 illustrates a similar arrangement, but in this arrangement three elongate elements 3',3",3''' are provided each extending between respective fixed points 4',4",4''' and 5',5",5'''. A single sensor 6 is provided adjacent the points 5',5",5''', this single sensor being connected to all three of the elongate elements 3',3",3'''.

Figure 3:
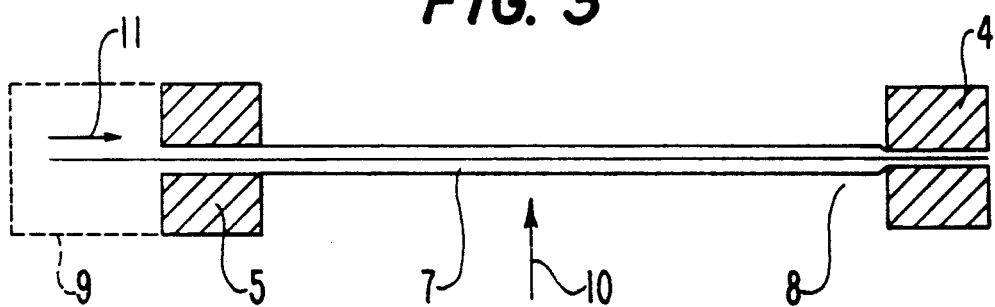
FIG. 3 is a schematic which shows a more detailed view of the sensor apparatus of FIG. 1.

FIG. 3 illustrates the sensor apparatus of FIG. 1 in more detail. The fixed point 4 is shown diagrammatically. This fixed point may take any form. Extending from the fixed point is a wire 7 which is protected within a flexible and extensible outer casing or sleeve 8. The wire 7 and casing 8 extend to the fixed point 5, which is again illustrated schematically. The casing 8 terminates at the fixed point 5, but the wire extends into a housing 9 which is illustrated in phantom. The housing 9 contains a sensor.

It is to be appreciated that if there is tension in the wire within the casing, for example in response to a pressure applied to the wire in the casing, as indicated by the arrow 10, then the wire within the housing will tend to move longitudinally to be withdrawn from the housing as indicated by the arrow 11. Tension will be applied to the wire in response to a side impact, if that impact is sufficient to deform the door 1 in which the wire 7 is mounted. Provided within the housing is a sensor which is responsive to the tension in the wire or the longitudinal movement which withdraws the wire from the housing.

Figure 4:
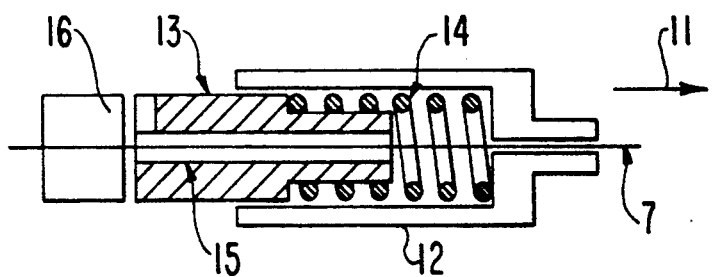
FIG. 4 is a sectional view of one embodiment of a housing for use with the apparatus of FIG. 3.

FIG. 4 illustrates one type of sensor that could be present within the housing 9. In this embodiment of the invention, the housing 9 includes a hollow cylinder 12 in which is mounted a piston element 13. The piston element may be formed of plastics or preferably of metal. A helical spring is provided between the housing and the piston tending to bias the piston out of the housing. A central axial bore 15 is provided through the piston, and the end of the wire 7 passes through that bore and is then connected to a switch element 16 remote from the closed end of the cylinder 12.

When the wire is moved longitudinally as indicated by the arrow 11, the wire will tend to pull the switch 16 into contact with the piston 13, thus tending to draw the piston 13 into the cylinder. The piston 13 will only move against the bias of the spring 14 which resists movement of the piston. The piston 13 has inertia which also effectively resists movement of the piston. Furthermore, as the piston 13 moves into the cylinder, air within the cylinder becomes compressed and passes through the bore 15, to escape to the atmosphere. Thus the bore 15 provides a throttling or choking effect. In other words, the bore 15 provides a restricted port for the egress of air from the cylinder. Alternatively, such a port may be provided in the wall of the cylinder. Thus movement of the piston into the cylinder is somewhat damped, by inertia, by the spring, and by the action of the piston.

The switch 16 is a pressure responsive switch and is only activated when pressed against the mass of the piston 13 with a significant force. Such a significant force is only generated in response to a rapid movement of the wire 7. A slower movement of the wire 7 does not cause sufficient pressure to be applied to the switch to activate the switch.

It will thus be appreciated that the sensor of FIG. 4 only responds to a real accident situation when it is essential to inflate an air-bag.

Figure 5:
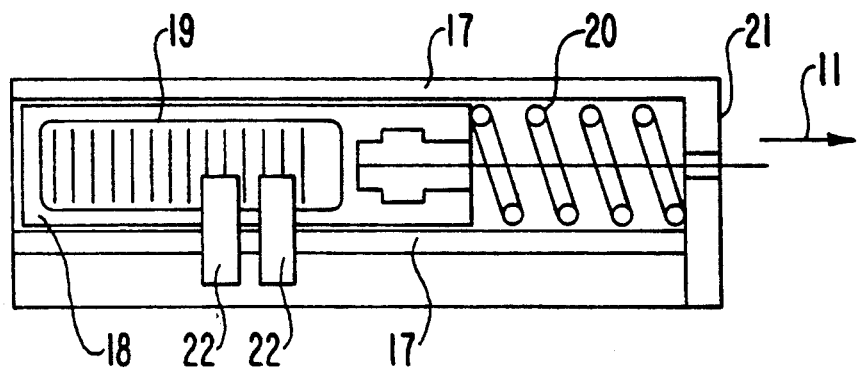
FIG. 5 is a schematic of another embodiment of housing for use with the embodiment of FIG. 3.

FIG. 5 illustrates a modified embodiment of the invention wherein the housing a contains guide elements 17 which guide, for axial movement, a member 18 on which is provided a "bar code" 19 or the like. A spring 20 is provided between the member 18 and the closed end 21 of the housing. The wire is connected to the member 18 and when the wire is moved longitudinally as indicated by arrow 11, the member 18 moves against the bias of the spring, along the guides 17.

One or more optical sensors 22 are provided adapted to sense movement of the member 18 carrying the bar code 19. The sensors may be adapted to respond to a rapid movement of the member 18, but not to respond to a slow movement of the member 18. Thus, again, in this embodiment the sensor only responds to a rapid movement of the wire, as caused by an impact serious enough to warrant inflation of the air-bag.

It will be appreciated that the embodiment of FIG. 5 may incorporate features of the embodiment of FIG. 4, in that a piston-and-cylinder arrangement may be associated with the member 18 and also the member 18 may be made to have a significant mass, thus providing an inertia effect.

While reference has been made, in FIG. 5 to an optical reader, it is to be appreciated that the bar code 19 may be in the form of a magnetic "stripe" formed on the member 18, and a magnetic reading head may be provided adapted to "read" the stripe as the member 18 is moved past the reading head.

What is claimed is:

1. A sensor arrangement in a motor vehicle for sensing impact on a side of the motor vehicle, comprising:
    first and second supports mounted adjacent the side of motor vehicle at substantially fixed points located adjacent the side of the motor vehicle and separated from one another;
    an elongate element extending between said supports adjacent the side of the vehicle, said elongate element having a first end fixed to said first support and a second end; and
    a sensor disposed at said second support and connected with the second end of said elongate element, said sensor sensing at least one of tension and longitudinal movement of said elongate element near said second support caused by an impact which deforms the vehicle and said elongate element at a position between said supports.

2. A sensor arrangement according to claim 1, wherein the elongate element is a wire.

3. A sensor arrangement according to claim 1, further comprising a flexible, inextensible sleeve or casing within which the wire is contained.

4. A sensor arrangement according to claim 1, wherein the sensor comprises a switch, a housing and a member disposed in and movable relative to the housing, the elongate element passing through the member and being connected to the switch, the switch being brought into contact with the member in response to tension in the elongate element, to operate the switch.

5. A sensor arrangement according to claim 4, including means for damping movement of the member and wherein the switch is a pressure responsive switch.

6. A sensor arrangement according to claim 1, and further including a spring operatively disposed for biasing said elongate element.

7. A sensor arrangement according to claim 1, wherein said elongate element comprises a plurality of elongate elements extending between said supports and being substantially parallel with each other.

8. A sensor arrangement according to claim 7, wherein said sensor comprises a plurality of sensors each being connected with a respective one of said elongate elements.

9. A sensor arrangement according to claim 7, wherein said sensor is a single sensor and said plurality of parallel elongate elements are connected to said single sensor.

10. A sensor arrangement according to claim 1, wherein the sensor comprises a housing, a spring disposed in the housing, and a member which is movable against the spring, the member being movable in response to tension in said elongate element.

11. A sensor arrangement according to claim 10, wherein the elongate element has significant mass and thus possesses inertia.

12. A sensor arrangement according to claim 10, wherein the member is in the form of a piston and the housing is in the form of a cylinder, and one of said piston and said cylinder includes a restricted port to provide egress for air within the cylinder on movement of the member.

13. A sensor arrangement according to claim 10, further including response means operatively associated with said movable member for producing an output in response to movement of said movable member.

14. A sensor arrangement according to claim 13, wherein said response means comprises a bar code on the movable member and a bar code reader disposed for reading said bar code.

15. A sensor arrangement according to claim 14, wherein said bar code is an optical bar code, and said bar code reader is an optical bar code reader.

16. A sensor arrangement according to claim 14, wherein said bar code is in the form of a bar code on a magnetic stripe, and said bar code reader is a magnetic reading head to read the stripe in response to movement of said member.

* * * * *